June 15, 1971  K. KOCH  3,584,340
EXTRUDER

Filed Aug. 28, 1968  2 Sheets-Sheet 1

United States Patent Office 3,584,340
Patented June 15, 1971

3,584,340
EXTRUDER
Klaus Koch, Sarstedt, Germany, assignor to Paul Troester Maschinenfabrik, Hannover-Wulfel, Germany
Filed Aug. 28, 1968, Ser. No. 755,947
Claims priority, application Germany, Sept. 1, 1967,
P 17 29 364.0; June 1, 1968, P 17 78 770.1
Int. Cl. B29b 3/22; B29f 3/06
U.S. Cl. 18—12                                    8 Claims

ABSTRACT OF THE DISCLOSURE

Extrusion apparatus of the kind including a worm for driving heat-softenable material along a tubular housing in which the worm rotates between a hopper at one end of the tube and an extrusion die at the other end of the tube, the worm having an intermediate section of its length dissimilar from feed and discharge sections on its opposite sides which is adapted to cause mixing and compression of the material passing along the tube, wherein the said intermediate section includes helical fins, preferably of much lesser pitch than that of the remainder of the worm, between opposite ends of every two of which there extends an intermediate fin generally in a plane containing the longitudinal axis of the worm and of lesser height radially of the worm than said helical fins.

---

Figure 1:
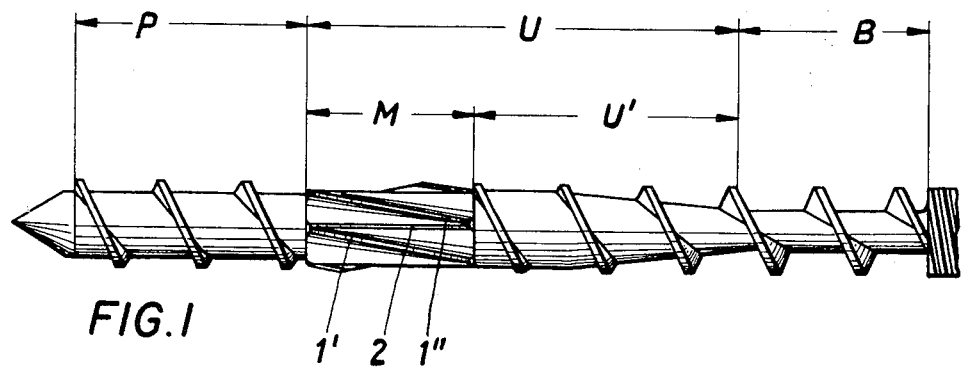

This invention relates to extrusion apparatus for heat-softenable materials, of the kind in which an extruder worm is rotatable in a tubular housing to convey the material from one end of the housing, where a feed hopper is arranged, to the other end of the housing where an extrusion die is arranged and through which the thermoplastic material is forced by the worm.

Various apparatus of this kind are known in which the worm includes an intermediate section of its length including a portion adapted to resist the passage of the material or to create a reverse flow of the material against the feeding of the material in the direction from the feed hopper end to the die end of the housing under the influence of feed and discharge sections of the length of the worm on opposite sides of the intermediate section. Thus the portion of the intermediate section of the worm between the feed section and mixing portion represents a first compression area where the heat-softenable material is subjected to high pressure due to the resistance or opposition of the intermediate section, resulting in an increase in the temperature of the material and a mixing of the same at this position. The portion of the feed section of the worm between the intermediate section and the die and adjacent the latter represents a second compression area.

In the prior art various proposals have been made for the design of the intermediate section but none has been fully satisfactory in ensuring a complete and thorough homogenising of the heat-softenable material in a simple, reliable apparatus which will render the material substantially fully isotropic.

Accordingly it is a principal object of the invention to provide an apparatus of the kind described in which the intermediate section of the worm is designed to ensure a fully homogenising mixing of the heat-softenable material such that when extruded through the die the material is substantially fully isotropic.

Another object of the invention is to provide extrusion apparatus of the kind described in which the mixing portion comprises helical fins of much lesser pitch than the flight of the remainder of the worm, each adjacent pair of helical fins in said mixing portion being joined by an intermediate fin which extends from an end of one of said pair of fins adjacent one end of said mixing portion to the end of the other of said pair of fins which is adjacent the other end of said mixing portion and which intermediate fin lies substantially in a plane containing the longitudinal axis of the worm.

Another object of the invention is to provide extrusion apparatus according to the preceding paragraph in which the height of each said intermediate fin radially of the worm axis is less than the height radially of the worm axis of the helical fins between which it is situated, said height of each intermediate fin preferably being in the region of 1 mm. less than that of the adjacent helical fins and preferably by a factor of not more than 10% of the latter.

Figure 2:
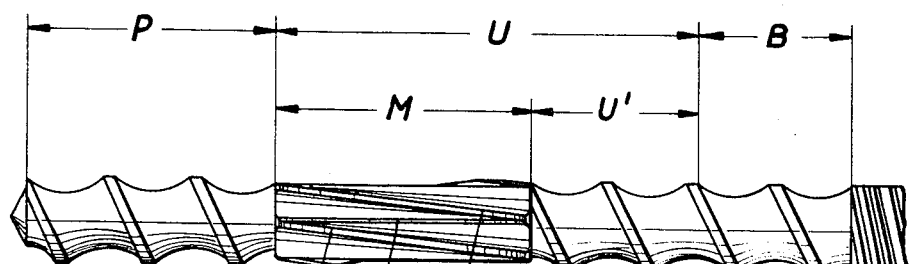
Figure 5:
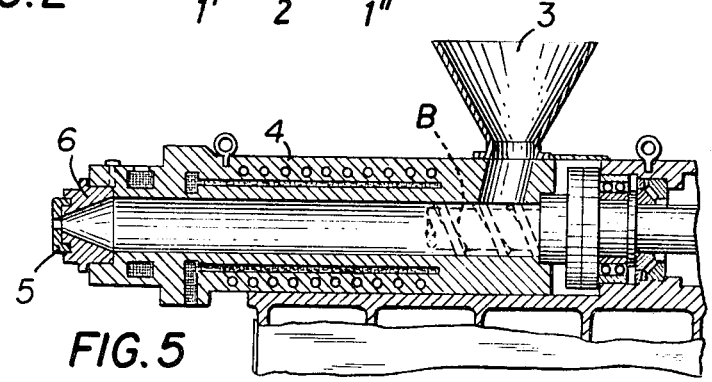
Figure 3:
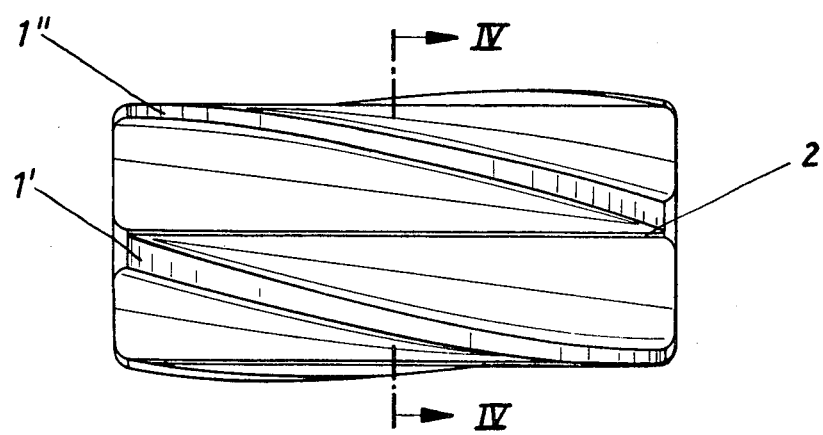
Figure 4:
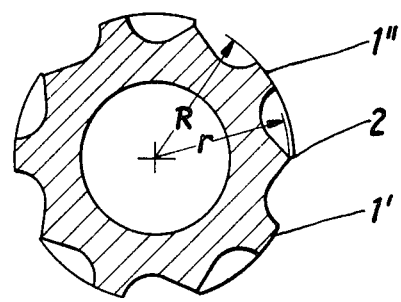

Further objects, features and advantages of the invention will become apparent from the following description of preferred embodiments thereof and with reference to the accompanying diagrammatic drawings, in which:

FIG. 1 is a side view of an extruder worm for incorporation in apparatus in accordance with the invention for extruding plastics materials, FIG. 2 is a view similar to FIG. 1 of an extruder worm for extruding rubber mixtures, FIG. 3 is a side elevation of the mixing and homogenising portion of the worm of FIG. 1 or FIG. 2, and FIG. 4 is a cross-section taken along the line IV—IV of FIG. 3. FIG. 5 is a side view partially in section of an extruder incorporating the invention.

The feed section B of the worm shown in FIG. 1 or FIG. 2 is succeeded immediately by the compression and mixing and homogenising section U and this latter by the discharge section P. The intermediate section U contains a compression portion U' immediately adjacent a mixing and homogenising portion M. In the mixing and homogenising portion M, according to the invention, each pair of adjacent helical fins 1' and 1", which are of the same hand but of much lesser pitch than the flight of the remainder of the worm, have their respective ends at opposite ends of the portion M joined by intermediate fins 2' which lie substantially in planes containing the axis of the worm across the pitch interval. The height r of each axial fin 2 is, as shown in FIG. 4, less, radially of the worm axis, than the height R of each fin 1', 1" of the mixing portion of the worm.

As seen in FIG. 5, the extrusion apparatus includes a feed hopper 3 above the feed section B of the worm rotatable in a tubular housing 4. The material being treated is introduced into the hopper 3 and is fed by the rotating worm to an extrusion die 5 arranged in an extruder head 6 at the other end of the housing. Heat-softenable material loaded into the hopper 3 may be a polymer plastics material or a natural or synthetic rubber, to which, possibly, materials such as pigments, stabilisers, softeners, expanders, vulcanising agents etc., have been added.

The flight of the extruder worm in the feed section B delivers the material to the compression portion U' of the intermediate section U. Due to resistance to passage of the material caused by the mixing portion M the material is subjected to plasticising pressure in the compression portion U'. In the illustrated embodiments the helical fins 1' and 1" of the mixing portion are of the same hand, though of different pitch, as the flight forming the remainder of the worm, but it will be appreciated that in order to increase compression of the material the helical fins 1', 1" might be given an opposite hand to the remainder of the flight of the worm.

The isotropic material emerging from the section U of the worm is delivered to the discharge section P where it is again compressed by forcing it through the extrusion die 5 located at the discharge end of the tubular housing 4 in which the worm rotates.

The previously mentioned additive materials may be added to thermoplastics material before loading it into the hopper 3, or during loading into the hopper. They are rotated with the thermoplastics material in the feed section B by the rotation of the worm, and thereby mixed with the thermoplastics material. This mixing is, however, insufficient to provide the desired isotropic properties of the extruded material.

Thus the invention is designed to solve the problem of arranging the three sections B, U and P of the worm in such a way that the extruder extrudes an isotropic material.

The intermediate section U of the worm is divided into two adjacent portions representing a compression portion U' and a mixing and homogenising portion M. The interval between each helical fin 1' and adjacent fin 1" is crossed by a fin 2 of wedge-shaped cross-section (see FIG. 4), its crest being lower by at least 0.1 mm. than, but by a most 10% of the depth of, the adjacent fins 1' and 1".

Each wedge-shaped longitudinal fin 2 creates a mixing and homogenising zone between each adjacent pair of fins 1' and 1" out of each pitch interval, according to the invention. By means of this arrangement in the mixing portion M additive materials included with the heat-softenable material are homogeneously intermixed with the plasticised heat-softened material in the mixing and homogenising portion M of the section U because the wedge-shaped fins 2 extending across each pitch interval of the fins 1' and 1" divide that pitch interval into two wedge-shaped sections having the effect, in an extruder of the kind described, of mixing the material within them homogeneously.

The feed and intermediate sections B and U may be between 3/10 and 4/5 of the total length of the worm, and the length of the portion M is preferably between four and six times the maximum radius R of the worm.

As can be gathered, further, from the drawing, the interval of the flight of the extruder worm throughout its length with the exception of the portion M may be equal to the maximum radius of the worm or 50% in excess of it, but in the mixing and homogenising portion M twenty to thirty times said radius. In a plastics material extruder the total length of the worm is generally between 30 and 60R and in a rubber extruder, generally 16 to 40R.

The completely homogeneously intermixed material proceeds from the mixing and homogenising portion M into the discharge section P. Due to the homogeneous properties of the material to be extruded, the depth of the flight of the worm can be cut up to 100% deeper in the discharge section P than in the intermediate section U and possibly may be shorter than shown since the homogenised material needs to stay in the section P only briefly.

The deeper thread in this discharge section P avoids the occurrence of undesired frictional heat better than in previous constructions. A further mixing and homogenising section U in accordance with the invention could be provided in succession to the discharge section P if the material to be extruded required such additional treatment.

It will be appreciated that the foregoing description and the accompanying drawings are given by way of non-limitative example only, and that further modifications are possible without departure from the spirit and scope of the present invention.

I claim:

1. Extrusion apparatus for heat-softenable materials comprising a worm rotatable in a tubular housing, inlet means for said material in the housing adjacent one end of the worm and an extrusion die at the end of the housing adjacent the other end of the worm, wherein the worm comprises successive sections of its length representing a feed section adjacent said inlet means, a discharge section adjacent the die and a mixing and homogenising section intermediate said feed and discharge sections, said intermediate section comprising compression and mixing portions adjacent the feed and discharge sections, respectively, the compression portion comprising a helical passage of the same hand as that of the feed section and the mixing portion comprising a helical passage defined by helical fins on the worm having a predetermined angular relation to a plane containing the axis of the worm, there being further provided on the worm between two adjacent ones of said helical fins an intermediate fin which extends across the passage between said two fins and which forms with a plane containing the axis of the worm a nil angle or a smaller angle than said predetermined angular relation of said helical fins.

2. Apparatus as claimed in claim 1, wherein said intermediate fin extends from the end of one of said two helical fins adjacent one end of said mixing portion to the end of the other of said helical fins adjacent the other end of said mixing portion.

3. Apparatus as claimed in claim 2, wherein said intermediate fin lies in a plane containing the axis of the worm and has a lesser height radially of the worm than the similar height radially of the worm of said helical fins.

4. Apparatus as claimed in claim 3, wherein the said radial height of said intermediate fin is in the region of 0.1 mm. less than said radial height of said helical fins.

5. Apparatus as claimed in claim 3, wherein the radial height of said intermediate fin is lower than that of said helical fins by not more than 10% of the latter.

6. Apparatus as claimed in claim 1, wherein said helical fins of said mixing portion have the same hand as the helical flight of the worm in the compression portion but form with a plane containing the axis of the worm a smaller pitch angle than does said flight.

7. Apparatus as claimed in claim 1, wherein the length of the extruder worm is between 16 and 40 times the maximum radius thereof, wherein the aggregate length of the feed and intermediate sections is between 0.3 and 0.8 said total length and wherein the length of the mixing portion is between four and six times said maximum radius.

8. Apparatus as claimed in claim 6, wherein the depth of the helical passage of the worm is generally similar throughout said intermediate section and is greater in the discharge section than in the intermediate section.

References Cited

UNITED STATES PATENTS

| | | | |
|---|---|---|---|
| 2,496,625 | 2/1950 | Henning | 18—12(SF)UX |
| 2,730,759 | 1/1956 | Glass et al. | 18—12(SF) |
| 2,765,491 | 10/1956 | Magerkurth | 18—12(SF) |
| 3,184,790 | 5/1965 | Araki | 18—12(SF) |
| 3,287,477 | 11/1966 | Vesilind | 18—12(SF)UX |
| 3,486,192 | 12/1969 | Leroy | 18—12(SF) |

J. SPENCER OVERHOLSER, Primary Examiner

R. L. SPICER, JR., Assistant Examiner

U.S. Cl. X.R.

18—30; 25—14